United States Patent [19]

Hasse et al.

[11] 4,385,338
[45] May 24, 1983

[54] POWER CONNECTOR WITH OVERVOLTAGE PROTECTION

[75] Inventors: Peter Hasse, Neumarkt; Johannes Wiesinger, Puchheim; Anton Meuser, Remseck; Erich Pivit, Allmersbach, all of Fed. Rep. of Germany

[73] Assignees: Dehn & Söhne & Co., KG, Nuremberg; AEG-Telefunken Aktiengesellschaft, Frankfurt, both of Fed. Rep. of Germany

[21] Appl. No.: 179,705

[22] Filed: Aug. 20, 1980

[30] Foreign Application Priority Data

Aug. 24, 1979 [DE] Fed. Rep. of Germany ....... 2934235

[51] Int. Cl.³ .............................................. H02H 9/06
[52] U.S. Cl. .................................... 361/130; 315/36; 361/91; 361/120; 361/129
[58] Field of Search ................. 361/56, 128, 130, 334, 361/91, 120, 129; 315/36

[56] References Cited

U.S. PATENT DOCUMENTS 1,636,544  7/1927  Atherton ............................. 361/129
2,802,150  8/1957  Yonkers, Jr. ......................... 361/56

FOREIGN PATENT DOCUMENTS 1175318  3/1959  France ................................. 361/128
504270  3/1976  U.S.S.R. .............................. 361/56

OTHER PUBLICATIONS

"Protection of Communications Systems Against Overvoltages", VDE Specification 0845.

Primary Examiner—Harry E. Moose, Jr.
Attorney, Agent, or Firm—Spencer & Kaye

[57] ABSTRACT

A power connector for providing overload protection for an electrical operating station connected to a power mains, composed of at least one overvoltage arrester of a first type which is capable of quenching the power mains surge current and at least one overvoltage arrester of a second type connected in series with said arrester of the first type, with the insulation of one overvoltage arrester, in its unfired state, meeting the requirements of a basic insulation or of the supplementary insulation for a protective insulation, and both arresters being constructed for dissipating the pulses generated by a direct stroke of lightning or nuclear electromagnetic pulses without adversely affecting the protection afforded thereby.

13 Claims, 4 Drawing Figures

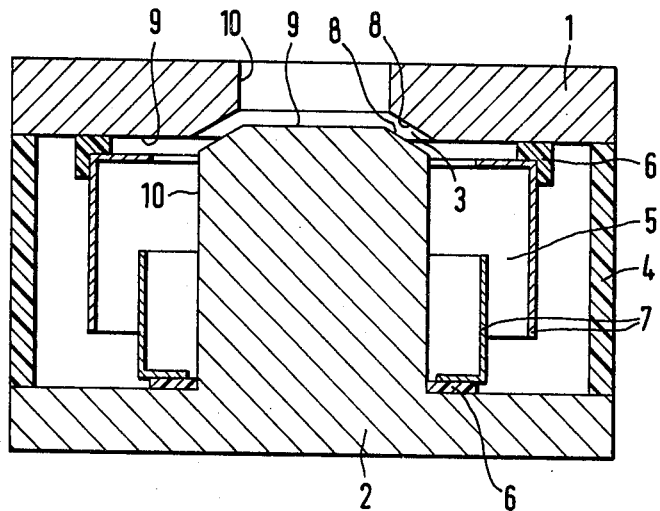
Fig. 2
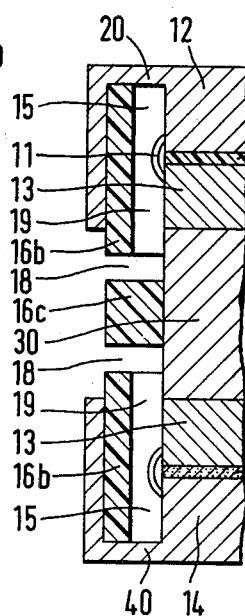 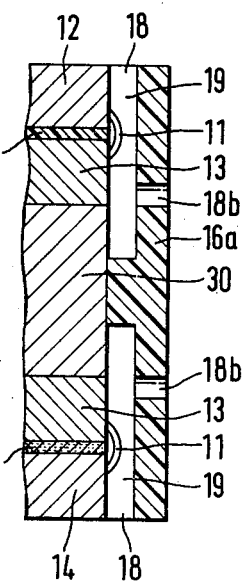
Fig. 3b     Fig. 3a

POWER CONNECTOR WITH OVERVOLTAGE PROTECTION

BACKGROUND OF THE INVENTION

The present invention relates to a power connector with overvoltage protection for protecting an electrical operating station against excess voltages.

The protective measure called protective insulation, defined by VDE 0100/5.73§7 (Specification of the Association of German Electrical Engineers [VDE]), offers advantages in power connections, particularly for transportable operating stations.

These advantages include:
1. independence of the protective measures from the particular mains supply;
2. independence of the respective grounding conditions. Such transportable operating stations with protectively insulated power connections are known (VDE 0800, Part 2b/11.76 §20).

Protective insulation is a protective measure which is completely effective in itself without the participation of protective conductors and additional protective devices. With the use of protective insulation no malfunction is expected.

In the case of protective insulation a distinction is made between double and reinforced insulation, which can be seen from (VDE 0730, Part 1/3.72 §2b) 10 and 11, respectively. Double insulation is composed of the basic insulation and so-called supplementary insulation (VDE 0730 Part 1/3.72 §2b) 8 and 9, respectively. Basic (or functional) insulation denotes the insulation necessary for the functioning of the equipment and for basic protection against shock. Supplementary insulation denotes an independent insulation provided in addition to the basic insulation, in order to ensure protection against electric shock in the event of a failure of the basic insulation (1973 IEC Publication 435). In contradistinction to the supplementary insulation, the basic insulation is not immune from malfunction. Reinforced insulation is a single insulation which, however, is equivalent to the double insulation. However, its use is permitted only if it is obviously impossible to separately provide basic insulation and supplementary insulation (VDE 0730 Part 1/3.73 §220). Transportable operating stations, for example, directional radio stations, are often installed at locations where, or in the vicinity of which, lightning may strike, so that it is necessary to provide overvoltage protection. When a protection insulated power connection is provided, the overvoltage protection circuit must be as reliable as the protective insulation so that no malfunction, with the resulting excess touch voltage, can be experienced.

Measures for providing protection against overvoltages have become known in practice only in conjunction with protective measures provided by means of protective conductors and protective devices (VDE 0.100/5.73 §§9–14) providing, for example, protective multiple earthing, protective earthing differential current earth-leakage protection, etc., but not in connection with protective insulation.

The VDE specification 0845 (DIN 57845) entitled "Protection of Communications Systems Against Overvoltages" describes an overvoltage protection circuit for the protectively insulated power connection of transportable operating stations in the telecommunications art according to VDE 0800 Part 2b/11.76 §20 (paragraph 3.11.6, FIG. 6).

Although this circuit meets the requirements of overvoltage protection, it does not meet the requirements of protective insulation when using commercially available overvoltage arresters. The latter have a limited insulation capability which may lead to quite dangerous situations since, for example, after a first response of the overvoltage arrester, its insulating resistance may drop considerably. A leakage current monitoring system for overvoltage arresters has therefore been proposed (VDE 0845a) for detecting a drop in the insulation resistance or for effecting the power connection by means of switches in the case of a malfunction, respectively. The grounding resistance of this protective system must lie below a given value, it must be checked and measured, respectively, and if it is used at the same location for long periods of time, it must also be monitored at given intervals, which requires a specially trained person.

Aside from the fact that sufficiently low grounding resistance can often not be realized at all, for example, when the system is installed on concrete, rock, sand, etc., it is very complicated and unsatisfactory for the user if safety in normal operation can be assured only by extensive monitoring and routine measurements. Such measures are also not within the spirit of the protective measure protective insulation, which is to provide completely autonomous and dependable protection to the user.

SUMMARY OF THE INVENTION

It is therefore an object of the present invention to provide a power connection with overvoltage protection and protective insulation according to VDE 0100, section 7 (protection against excessive touch voltages) which does not require any complicated measures on the part of the user.

A further object of the invention is to maintain such protection in effect even after occurrence of a high current load due, for example, to being struck directly by lightning.

These and other objects are achieved, according to the invention, by the provision of a power connector for providing overload protection for an electrical operating station connected to a power mains, which connector is composed of at least one overvoltage arrester of a first type which is capable of quenching the power mains surge current and at least one overvoltage arrester of a second type connected in series with the arrester of the first type, with the insulation of one of the overvoltage arresters, in its unfired state, meeting the requirements of the basic insulation or of the supplementary insulation respectively in the case of protective insulation, and both of the arresters being constructed for dissipating the pulses generated by a direct stroke of lightning or nuclear electromagnetic pulses without adversely affecting the protection afforded thereby.

The present invention provides a protectively insulated power connection with overvoltage protection whose protection against too high voltages remains unaffected even by direct strokes of lightning.

BRIEF DESCRIPTION OF THE DRAWING

FIGS. 2, 3a and 3b are cross-sectional views of embodiments of arresters which can be employed in the structure of FIG. 1.

DESCRIPTION OF THE PREFERRED EMBODIMENTS

Figure 1:
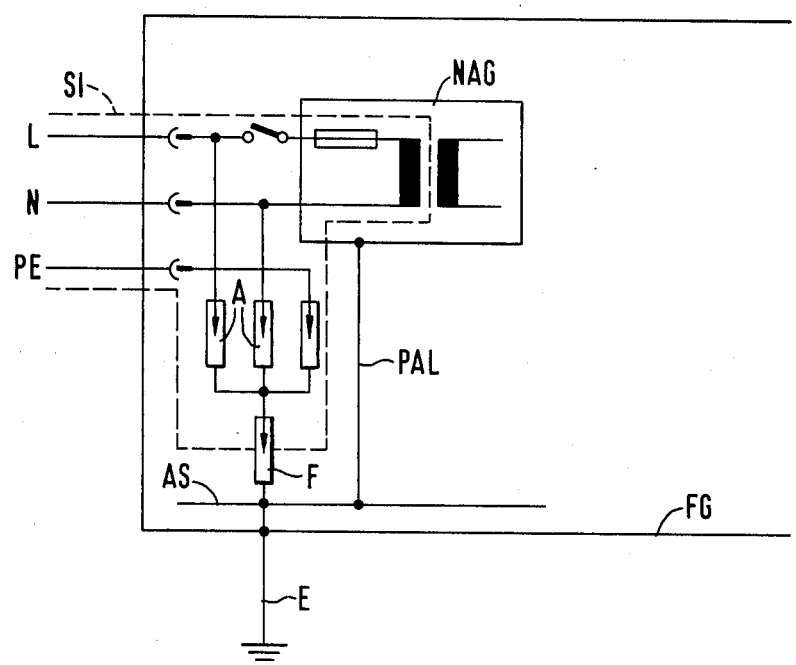
FIG. 1 is a circuit diagram of a preferred embodiment of a connecting structure according to the invention.

FIG. 1 shows an electrical operating station which may be transportable, mounted in a housing FG and connected with a power mains via a power cable including a current conducting conductor L, a neutral conductor N and a protective conductor PE.

The protective conductor PE is included in the cable because also any class I equipment (equipment with protective conductor) can be connected to the cable. PE must be included in the overvoltage protection and therefore provided with an overvoltage arrester. Because of the protection measure "protective insulation" it has to be treated like a conductor with dangerous touch voltage.

The current conducting conductors L and N are connectable via conventional switches and fuses or circuit breakers, to the intermediate transformer of a power switching device NAG of the operating station. Directly at the point of entry into the mobile station, or vehicle, all conductors of the power cable are connected with overvoltage arresters A of the first type having their base points connected to the head point of an overvoltage arrester F of the second type, which is a spark gap. The base point of the spark gap F is connected to a potential equalizing bar AS extending within the operating station. The potential equalizing bar AS itself is connected to the housing FG of the vehicle and, via an external ground connection E, to ground. The metal housings of the power switching device NAG, as well as of the other telecommunication instruments in the operating station, are connected via a potential equalizing conductor PAL, to the potential equalizing bar AS.

The overvoltage arresters A of the first type must meet the requirements set for low voltage networks, operating with voltages up to 1000 volts, in VDE 0675 "Richtlinien für Überspannungsschutzgeräte, Teil 1, Ventilableiter für Wechselspannungsnetze" [Guidelines for Overvoltage Protection Devices, Part 1, Valve-type Arresters for Alternating Voltage Networks] and, in particular, the quenching behavior required by VDE 0675, even when exposed to direct strokes of lightning. Their reliability corresponds to that of a basic insulation.

The overvoltage arrester F of the second type, the spark gap, provides the supplementary insulation for the overvoltage protection circuit. The dimensions of the spark gap F must be such that it is capable of receiving the sum current of the three overvoltage arresters of the first type A. In one aspect of the invention the arrester F may comprise one or more varistors connected to a spark gap.

The primary of the device NAG, the connections to conductors L, N and PE, arresters A and at least part of arrester F are enclosed by a protective insulation SI, shown in dashed lines, having a voltage breakdown resistance which corresponds to at least the sum of the response voltage of the spark gap F and the response voltage of the overvoltage arresters of the first type A. It must be considered in this connection that the insulation of the power connection must have the reliability required for a protective insulation with respect to the vehicle housing FG as well as the output circuit of the intermediate transformer.

FIGS. 2, 3a and 3b illustrate embodiments of arresters which can be suitably used as elements A and F in the structure of FIG. 1. These arresters are the subject of the following copending applications filed on or about the same date as the present application by Peter Hasse et al., Ser. No. 179,706, now U.S. Pat. No. 4,345,295 for ARRESTER WITH SPARK GAP, claiming priority of FRG Application No. P 29 34 236.7, and Peter Hasse et al, Ser. No. 179,704, now U.S. Pat. No. 4,345,293, for ARRESTER, claiming priority of FRG Application P 29 34 237.8.

FIG. 2 shows an advantageous embodiment of an arrester in the form of an axially symmetrical arrangement of an electrode 1 in the form of a perforated disc having an inner cylindrical lateral surface 10, and of an electrode 2 arranged therebeneath and having the shape of a solid cylinder. Electrodes 1 and 2 have respective chamfered inner and outer edges 8. These two chamfered edge surfaces delimit an arc discharge region 3 which, in the absence of an arc constitutes a gas, and preferably air, insulator. A spacer 4 is provided between the outer rim of the disc-shaped, lower extension of the electrode 2 and the outer rim of the electrode 1 at a location far removed from the region of arc discharge 3. During an arc discharge a mass of gas under pressure is formed in the discharge zone 3. Most of this gas can escape upwardly from region 3. However, it is unavoidable that a relatively small portion of the gas will be urged into the chamber 5 delimited by the electrodes 1 and 2 and the spacer 4.

Chamber 5 is fashioned in the form of a labyrinth in such a way that an artificial lengthening of the path of the gases to the spacer, as well as cooling, are provided. This provides the advantage of preventing or minimizing vapor deposition of metal particles torn away from the electrodes during the arc discharge on the inner surface of the spacer; this is an absolute prerequisite for a permanently and unrestrictedly effective protective insulation. Cooling is accomplished through the metal walls 7 of the labyrinth which exhibit high heat conductivity. These walls are mounted in an insulated fashion via insulating supports 6 on the electrodes 1 and 2 to prevent a spreading of the arc discharge to the zone of the labyrinth.

By means of such a laybrinth arrangement, it is made possible that a major part of the material in the gases produced during arc discharge can be deposited at the inlet on the labyrinth walls, so that the insulation value of the spacer, and thus of the spark gap, is not substantially impaired even after many high loads due to currents produced by lightning strikes. Advantageously, wear and tear can be kept at a very low value by making each of electrodes 1 and 2 of a suitable electrode material, for example, tungsten-copper, exhibiting a high resistivity against burn-off.

With an appropriate construction of the electrodes, the arc can be maintained stably in the air gap provided therefor, and thus a vapor deposition on the spacer-insulator can likewise be counteracted.

An advantageous feature of this arrester is that after cessation of a discharge, the air spark gap is blown through from the inside toward the outside, due to the excess pressure in the chamber, and thus the spark gap is cleansed.

A typical feature of this arrester is that after an accumulated load corresponding to approximately a thousand statistically averaged lightning strikes but also including above-average lightning current loads, it is still fully operable and exhibits insulation resistance of $>10^{10}$ Ω. A melting of the electrodes, or even merely tendencies toward such melting, could not be observed.

FIGS. 3a and 3b show two embodiments of arresters constituted by electrode arrangements defining two series-connected spark gaps as disclosed in FRG DOS 2,627,648. Each arc discharge zone 11 is located between the outer surface of pairs of disc-shaped electrodes 12 and 13 or 13 and 14, respectively, held by spaced-apart insulating discs 16 and 16', with electrodes 13 being connected together by a connecting element 30. A hollow cylinder 16a or cylinders 16b consisting of a gas stored in the solid phase or a similar material generating a gas under the effect of heat and provided with outlet openings 18, 18b disposed around the electrodes and/or the arc zone produced the result that, due to the heat of the arc, a quenching gas is generated and the arc is urged somewhat toward the outside and quenched after the overvoltage has ceased. Therefore, after the mains voltage reappears, no renewed ignition can take place.

In FIG. 3a, a single hollow cylinder 16a is provided around both arc gaps, whereby the arc gaps are isolated from each other so that arcs thereacross cannot combine. The hollow cylinder 16a has annular outlet openings 18 at the top and bottom and outlet openings 18b in the form of bore holes on its lateral surface. The insulating disc 16 of the upper spark gap can likewise consist of a gas in solid phase or a similar material, emitting a gas under the thermal influence of the arc in zone 11. By means of such a spacer disc, an additional improvement in quenching characteristic is attained.

The spacer disc 16' of the lower spark gap between the electrodes 13 and 14 does not consist of a gas in the solid phase but rather of mica. This affords the advantage that the dual spark gap exhibits the required insulation resistance even after the gas of separator 16 of the upper spark gap has been burnt off or melted after a long-term usage and can no longer adequately insulate the electrodes 12 and 13 from each other.

FIG. 3b shows another embodiment of a dual spark gap wherein each spark gap is surrounded by a hollow cylinder 16b. Each hollow cylinder is mounted at a respective one of outer electrodes 12 and 14 by being inserted in likewise hollow-cylindrical extensions 20 and 40 thereof, in such a way that there is only one aperture located at the connecting element 30 of the two electrodes 13. By means of an annular member 16c of insulating material disposed around, and supported by, the connecting element 30, the two spark gaps are likewise isolated from each other, so that their arcs cannot combine. By this arrangement of electrodes and insulating element, a chamber-like zone 15 is created around each outer electrode 12 and 14 wherein an excess gas pressure can be generated during the arc discharge. This excess gas pressure can be dissipated via the annular duct 19 of FIG. 3a or past the annular insulating element 16c of FIG. 3b, and through the associated aperture 18, which has the shape of an annular band, thus cleanly blowing out the arc discharge zone.

It will be understood that the above description of the present invention is susceptible to various modifications, changes and adaptations, and the same are intended to be comprehended within the meaning and range of equivalents of the appended claims.

The illustrated arrester of FIGS. 3a, b can serve as the first type A and the arrester shown in FIG. 2 may serve as the second type F.

For the arresters in FIGS. 2,3a, b a typical tungsten copper alloy is 20% copper 80% tungsten, a specific material for spacer 4 and support 6 is a fibre reinforced epoxy. The material for walls F is brass, the insulation level provided by spacer 4 is $10^4$ MΩ. Typical dimensions for the gap are 1 to 2 mm with a diameter of the central electrode of 15 to 25 mm. The typical length of the labyrinth path defined by chamber 5 may be up to 10 cm.

Typical breakdown voltage of the gap is 3 to 5 kV and the arc discharge voltage is below 50 volts.

The preferrable material for the elements 16, 16a, b, c is POM (Polyoxymethylen), the evaporation of this material starts at 300° C. The minimum arc current is about 300 A.

The material for electrodes 12,13,14 is copper-tungsten (20–80), for element 30 brass and the level of insulation resistance for the spacers 16,16',16a, b, c is about 10 MΩ; the spacers have a typical diameter of 20 to 30 mm and the thickness of 0.5 mm.

The breakdown voltage is about 1.5 kV and the arc discharge voltage is between 30 and 50 volts.

What is claimed is:

1. A power connector for providing overload protection for an electrical operating station having a housing and connected to a power mains having a predetermined rated line voltage, said power connector comprising at least one overvoltage arrester of a first type having a given breakdown voltage higher than the rated line voltage and which is capable of quenching the power mains surge current and at least one overvoltage arrester of a second type having a breakdown voltage higher than said given breakdown voltage and connected in series between said arrester of the first type and ground and the housing of the station, with the insulation of said at least one over-voltage arrester of the first type, in its unfired state, meeting the requirements of a basic insulation, and with the insulation of said at least one overvoltage arrester of the second type, in its unfired state, meeting the requirements of a supplementary insulation, both together meeting the requirements of double insulation and being constructed for dissipating the pulses generated by a direct stroke of lightning or nuclear electromagnetic pulses without adversely affecting the protection afforded thereby.

2. An arrangement as defined in claim 1 wherein said overvoltage arrester of the first type comprises at least one varistor or spark gap.

3. An arrangement as defined in claim 1 or 2 wherein said overvoltage arrester of the second type comprises at least one spark gap.

4. An arrangement as defined in claim 3 wherein said arrester of the second type further comprises at least one varistor connected to said spark gap.

5. An arrangement as defined in claim 1 wherein said station comprises a potential equalizing bar, said overvoltage arrester of the first type has a head point connected to a conductor of the power mains and said overvoltage arrester of the second type has a base point connected to said potential equalizing bar of said operating station.

6. An arrangement as defined in claim 5 wherein said potential equalizing bar is grounded and connected with the housing of said operating station.

7. An arrangement as defined in claim 5 wherein said station comprises at least one device, a metal housing enclosing said device, and a potential equalizing conductor connecting said housing to said bar.

8. An arrangement as defined in claim 1 wherein said at least one said arrester of the second type comprises: two electrodes spaced apart to define a gas spark gap presenting an arc discharge region, a spacer member of insulating material interposed between the electrodes and forming with the electrodes the walls of a chamber separate from the arc discharge region, said arc discharge region providing a passage between said chamber and the environment outside said arrester, and means associated with said chamber for establishing therein a labyrinth gas flow path between said arc discharge region and said spacer member.

9. An arrangement as defined in claim 1 wherein said at least one arrester of the first type comprises at least two electrodes spaced apart to define at least one spark gap forming an arc discharge region, insulating means in contact with each said electrode and holding said electrodes in spaced-apart relation, and means defining a first chamber adjacent the arc discharge region and providing a chamber wall of an insulating material spaced from said insulating means, said insulating material emitting a quenching gas under the effect of heat and being provided with at least one outlet aperture through which the gases emitted under the effect of the heat generated during arc discharge can escape.

10. A device for providing overvoltage protection for an electrical operating station connected to a power supply, wherein the station has a housing and the power supply includes a plurality of conductors having a predetermined rated line voltage, said device comprising:

a plurality of overvoltage arresters of a first type each having a first electrode and a second electrode, said first electrode of each said arrester of the first type being connected to a respective one of the conductors and said second electrodes of said arresters of the first type being connected together at a common point, each said arrester of the first type having a given breakdown voltage above the rated line voltage, and a single arrester of a second type having a first electrode and a second electrode, said first electrode of said arrester of the second type being connected to said common point and said second electrode of said arrester of the second type being connected to the housing of the station, said arrester of the second type having a breakdown voltage greater than the breakdown voltage of each of said arresters of the first type.

11. A device as claimed in claim 10 wherein said plurality of conductors includes at least one current carrying conductor and a neutral conductor, whereby each of the conductors of the power supply is connected to a respective one of said first electrodes of said plurality of arresters of the first type.

12. A device as claimed in claim 11 wherein said common point is not directly connected to any conductors associated with said power supply.

13. A device as claimed in claim 12 wherein said second electrode of said arrester of the second type is grounded.

* * * * *